United States Patent [19]
Bixby et al.

[11] 3,723,131
[45] Mar. 27, 1973

[54] PREPARATION OF READY-TO-EAT PEANUT BUTTER CONTAINING CEREAL

[75] Inventors: Douglas G. Bixby, Cary; Kenneth L. Helmke, Elgin, both of Ill.

[73] Assignee: The Quaker Oats Company, Chicago, Ill.

[22] Filed: Oct. 6, 1970

[21] Appl. No.: 78,627

[52] U.S. Cl............................................99/83, 99/82
[51] Int. Cl..............................A23l 1/10, A23l 1/18
[58] Field of Search......................................99/82, 83

[56] References Cited

UNITED STATES PATENTS 3,600,193   8/1971   Glabe et al. ..............................99/83

Primary Examiner—Raymond N. Jones
Attorney—Milton C. Hansen and Donnie Rudd

[57] ABSTRACT

A ready-to-eat breakfast cereal impregnated with a nonheat-degraded liquefied peanut butter is produced by preparing a cereal base, drying the base to below 14 percent by weight moisture, permeating the dried base with liquid peanut butter, and further drying the permeated base.

5 Claims, No Drawings

3,723,131

PREPARATION OF READY-TO-EAT PEANUT BUTTER CONTAINING CEREAL

BACKGROUND OF THE INVENTION

1. Field of the Invention

This invention relates to a ready-to-eat breakfast cereal which has a peanut butter flavor.

2. Description of the Prior Art

The present invention constitutes the first commercially practical peanut butter flavored ready-to-eat breakfast cereal. The desire to have a peanut butter flavored ready-to-eat breakfast cereal has been long known. The problems associated with producing such a cereal have heretofore always been sufficient to make a commercial product impractical. The primary reason for this impracticality is that peanut butter has a rather high fat content and is therefore subject to rancidity. When peanut butter is added to a cereal product, it even further enhances the chances of rancidity. Conventional attempts to produce a peanut butter cereal would only include preparing a cereal mixture which would include some type of peanut butter or peanut butter flavoring and then extruding or toasting the cereal mixture to form a cereal product. If either of the conventional processes for making cereal products was used, the peanut butter or peanut butter flavoring would very quickly become rancid due to the exposure to high temperatures. This would occur regardless whether or not extrusion or toasting were the chosen methods of producing the cereal product. The present process overcomes each of the deficiencies of the prior art and produces a new and unique product which fulfills the requirements of a long felt need.

SUMMARY OF THE INVENTION

It is an object of this invention to produce a ready-to-eat breakfast cereal product which has peanut butter flavor.

It is another object of this invention to provide a ready-to-eat breakfast cereal product which contains peanut butter and which does not become rancid during normal storage.

It is a further object of this invention to provide a process for producing a peanut butter flavored ready-to-eat breakfast cereal.

The objects of this invention are accomplished by a ready-to-eat breakfast cereal comprising a cereal base impregnated with a nonheat-degraded liquefied peanut butter. In its preferred form, the nonheat-degraded liquefied peanut butter comprises a mixture of peanut butter and edible oil. The preferred mixture of peanut butter and edible oil comprises from 50 to 100 parts by weight peanut butter with from 1 to 50 parts by weight edible oil.

In a still further preferred embodiment of this invention the mixture of peanut butter and edible oil also includes an antioxidant.

Although we claim a much broader scope as our invention, the preferred cereal bases for this invention are those produced by the well-known cereal extruder.

The objects of this invention are further accomplished by a process for preparing a ready-to-eat breakfast cereal product, said process comprising the steps:

A. preparing a cereal base;
B. drying the cereal base to below 14 percent by weight moisture;
C. permeating the dried cereal base with liquid peanut butter; and
D. further drying the permeated cereal base to a moisture content of from about 1 percent to about 5 percent by weight, said drying being accomplished without substantially heating the permeated product.

In its preferred embodiment the process of this invention is the process in which the common cereal extruder is used. In such a case the process comprises the steps:

A. admixing cereal based ingredients with water;
B. applying heat and pressure to the above mixture with an extruder;
C. suddenly releasing the pressure on the mixture to form an expanded cereal base;
D. drying the expanded cereal base to below 14 percent by weight moisture;
E. permeating the dried cereal base with liquefied peanut butter; and
F. further drying the permeated cereal base to a moisture content of from about 1 percent to about 5 percent by weight, said drying being accomplished without substantially heating the permeated product.

Again, the preferred liquefied peanut butter is a mixture of peanut butter and an edible oil and may contain an antioxidant.

In a still further preferred embodiment of this invention the expanded cereal base is first coated with a sugar-syrup solution and then dried to a moisture content below 10 percent by weight before application of the liquid peanut butter.

The ready-to-eat breakfast cereal of this invention comprises a cereal base impregnated with a nonheat-degraded liquefied peanut butter. By use herein of the term "cereal base" we intend to mean a cereal product which has been processed for a substantial portion of its total cooking and which is ready for either consumption or coating. We intend to include in this invention cereal bases which are produced by extruding a cereal mixture under high temperatures and pressure which in turn causes the cereal base to be created in an expanded state. The cereal base is then conventionally heated and dried in a stream of hot air prior to use in this invention. We also intend to include as a product of this invention those cereal products which are of the toasted type, that is which use lower temperatures and pressures to form the product and then toast the product in a toasting oven. Either of these type cereal bases is acceptable for use in this invention. The preferred cereal base for use in this invention, however, is the cereal base made from the conventional extruding equipment. The particular advantage of this type cereal base is that it is greatly expanded, and therefore, makes it easier to be impregnated with liquefied peanut butter.

The cereal base is impregnated with a nonheat-degraded liquefied peanut butter. By use herein of the term "peanut butter" we intend to mean peanut butter as it is well-known to the art. Peanut butter is generally considered to be blanched, dry roasted peanuts, finely divided, with additives to improve spreadability and smoothness. Liquefication of the peanut butter can be accomplished in at least two ways. The least preferred method is to heat the peanut butter until it becomes liquid and then impregnate the cereal base with the peanut butter. This process is not preferred, however, since heating of the peanut butter increases the risk of oxidation or rancidity of the fat in the peanut butter. It must be emphasized at this point, however, that at no place in the process can the peanut butter be heated until it is degraded. In other words, the peanut butter must be nonheat-degraded.

The preferred method of liquefying peanut butter is to mix the peanut butter thoroughly with an edible oil. When the peanut butter is mixed with an edible oil, the peanut butter should be present in an amount of from 50 to 100 parts by weight peanut butter with from 1 to 50 parts by weight edible oil. The peanut butter and edible oil are mixed together thoroughly and this mixture is then used to impregnate the cereal base.

By use herein of the term "edible oil" it is intended to mean all of the well-known edible oils which are used in the food industry and which do not create adverse taste. Among the many oils that may be used are coconut oil, safflower oil, peanut oil, corn oil and the other well-known vegetable oils. The preferred oil for use in this invention is coconut oil.

If desirable, the edible oil may contain an antioxidant. The particular antioxidant oil which may be used is a matter of preference and would include the well-known edible antioxidants that are commonly used with an edible oil. Two such antioxidants are butylated hydroxyanisole and butylated hydroxy toluene with butylated hydroxyanisole being the antioxidant that we prefer to use.

The first step of the process of this invention comprises preparing a cereal base. The cereal base is the conventional cereal product that has been discussed hereinbefore. After the cereal base has been prepared, it must be dried to below 14 percent by weight moisture. The drying is absolutely necessary in order to insure that the cereal base can absorb the liquefied peanut butter as well as to insure that the cereal base does not become too soggy and lose its shape. It is preferred that the drying of the cereal base be to the moisture content of from 4 to 8 percent by weight moisture.

After the cereal base has been dried, it is then permeated with liquid peanut butter. Any standard permeating method may be used for accomplishing this step. The simplest and preferred method, however, is to tumble the cereal base in a drum and spray the liquefied peanut butter therein during the tumbling process. Conventional enrobers may also be used to accomplish this permeating step. With the cereal base being somewhat expanded and rather low in moisture, it readily absorbs the liquid peanut butter and becomes permeated throughout with the liquefied peanut butter. This creates even texture and flavor throughout the entire product.

After the cereal base has been permeated with the peanut butter, it is then dried to a moisture content of from about 1 percent to about 5 percent by weight with the drying being accomplished without substantially heating the permeated product. The final drying must reduce the moisture to the range of from about 1 percent to about 5 percent by weight. If the moisture is reduced below about 1 percent by weight, inner action begins to occur in the product which leads to undesirable taste. If the final moisture is above about 5 percent by weight, then the product has reduced storage stability and begins to become commercially undesirable.

The final drying step must be accomplished without substantially heating the permeated product. The restriction against substantial heating of the permeated product is intended to mean a restriction against any amount of heating of the permeated product which would cause either an inner action therein or an increase in rancidity or oxidation of any material in the product or a reduction in storage life. We do not intend to mean that the product should not be heated in the final drying step but we would require that the heating be kept to a very minimal amount to provide adequate protection of the product. The preferred final drying step is one in which the product is dried by passing nonheated air over the product to evaporate the moisture. In the preferred embodiment no heating of the product occurs during the final drying step.

The preferred process of this invention is one in which the cereal base is produced in a conventional cereal extruder. In such a process cereal base ingredients are admixed with water and then placed in the extruder where they are subjected to heat and pressure. Upon exiting from the extruder the pressure is suddenly released and the cereal base expands. Generally, the temperature in the extruder is held between 212° F. and a temperature at which degradation of the product occurs. The pressure is in turn kept high enough to prevent flashing of the water in the extruder. The cereal base is then dried to a moisture content below 14 percent by weight, permeated with liquefied peanut butter, and then dried to a moisture content of from about 1 percent to about 5 percent by weight.

In the most preferred embodiments of this invention the above process is followed with the exception that a sugar-syrup solution is used to coat the expanded cereal base after the first drying step. The moisture content of the sugar-syrup coated cereal base is then reduced below 10 percent by weight and the process is continued by the permeating of the cereal base with liquid peanut butter. The sugar-syrup solution can be any of the standard sugar-syrup solutions used to coat or frost cereal products. The simplest such solution is merely a saturated solution of sugar in water.

DESCRIPTION OF THE PREFERRED EMBODIMENTS

This invention may be more fully described but is not limited by the following examples.

Example 1

Seven parts by weight corn flour, 1 part by weight oat flour, 1 part by weight rice flour, and 1 part by weight sugar were mixed together. During mixing sufficient moisture was added to bring the moisture content to about 18 percent by weight. The mixture was then placed in an extruder where conventional operation subjected it to a temperature and pressure sufficient to cause the material to expand upon leaving the extruder. The temperature in the extruder varied from about 220° F. to about 350° F. and the pressure in the extruder varied from just above 15 psig to 3,000 psig. Upon exiting from the extruder the material was cut into small pieces and allowed to drop into an air stream where it was heated and dried. The dried cereal base had a moisture content of about 5 percent by weight. A mixture of 90 parts by weight peanut butter with 10 parts by weight coconut oil was prepared and 0.05 parts butylated hydroxyanisole mixed therein. The cereal base was then placed in an enrobing machine and the liquefied peanut butter was added thereto. The total mixture represented 85 parts by weight cereal base to 15 parts by weight liquid peanut butter. The peanut butter coated cereal base was further tumbled until the peanut butter had fully permeated the cereal base. At this time, the permeated product was placed on a porous conveyor and air passed therethrough to bring the final moisture content to about 4 percent by weight. The finished product was then ready to be placed in a bowl and milk added thereto to provide a delicious ready-to-eat cereal product. It is to be understood, however, that when using this extrusion type apparatus to produce the cereal base, the moisture should be from about 15 percent to about 20 percent by weight in the mixture prior to placing the mixture in the extruder.

Example 2

Example 1 was repeated except the cereal base was first coated with a sugar-syrup solution. The sugar-syrup solution was a mixture prepared by mixing 6 parts by weight sugar with 2 parts by weight water. The sugar solution was applied in an amount equal to the weight of the cereal base. The sugar coated product was then dried to a moisture content of about 5 percent by weight and the peanut butter permeating step of Example 1 was then followed to provide a very good peanut butter flavored ready-to-eat breakfast cereal.

Example 2 constitutes the preferred embodiment of this invention.

While the amount of materials used in the above defined examples may change to provide various flavor combinations, the conditions and amounts to which these changes can be made must be in accordance with the limitations hereinbefore defined. In particular, the moisture content and drying at the various processing steps must be strictly adhered to.

Having fully defined this new and unique invention, we claim:

1. A process for preparing a ready-to-eat cereal product, said process comprising the steps:
  A. admixing cereal based ingredients with water;
  B. applying heat and pressure to the above mixture with an extruder;
  C. suddenly releasing the pressure on the mixture to form an expanded cereal base;
  D. drying the expanded cereal base to below 14 percent by weight moisture;
  E. permeating the dried cereal base with a non-heat degraded liquefied peanut butter; and
  F. further drying the permeated cereal base to a moisture content of from about 1 percent to about 5 percent by weight, said drying being accomplished without substantially heating the permeated product.

2. A process as in claim 1 wherein the liquefied peanut butter comprises a mixture of from 50 to 100 parts by weight non-heat degraded peanut butter with from 1 to 50 parts by weight of an edible oil.

3. A process as in claim 2 wherein the non-heat degraded liquefied peanut butter contains an antioxidant.

4. A process as in claim 1 wherein the dried expanded cereal base is coated with a sugar-syrup solution and then dried to a moisture content below 10 percent by weight before application of the non-heat degraded liquefied peanut butter.

5. A process as in claim 4 wherein the liquefied peanut butter comprises a mixture of from 50 to 100 parts by weight non-heat degraded peanut butter and from 1 to 50 parts by weight edible oil.

* * * * *